June 13, 1961   J. J. GIBBONS ET AL   2,987,727
AUTOMATIC APPARATUS FOR ASSEMBLING A POCKET CLIP WITH A CAP
Filed April 17, 1959   6 Sheets-Sheet 1

INVENTORS
JAMES J. GIBBONS
SOLOMON S. SCHNELL
BY

ATTORNEY

June 13, 1961 J. J. GIBBONS ET AL 2,987,727
AUTOMATIC APPARATUS FOR ASSEMBLING A POCKET CLIP WITH A CAP
Filed April 17, 1959 6 Sheets-Sheet 4

INVENTORS
JAMES J. GIBBONS
SOLOMON S. SCHNELL
BY

ATTORNEY

INVENTORS
JAMES J. GIBBONS
SOLOMON S. SCHNELL
BY

ATTORNEY

# United States Patent Office 2,987,727
Patented June 13, 1961

2,987,727
AUTOMATIC APPARATUS FOR ASSEMBLING A POCKET CLIP WITH A CAP
James J. Gibbons, 347 56th St., New York, N.Y., and Solomon S. Schnell, New York, N.Y. (225—20 Mantone Ave., Laurelton, N.Y.); said Gibbons assignor to said Schnell
Filed Apr. 17, 1959, Ser. No. 807,088
23 Claims. (Cl. 1—106)

The present invention relates to apparatus for assembling the caps and pocket clips of articles, such as fountain pens, ball point pens, or the like, and particularly to apparatus for automatically stapling metal pocket clips to plastic caps of such articles.

It is the general object of the present invention to provide cap and clip assembly apparatus of the character described which is particularly adapted for use in stapling clips that are automatically successively fed thereinto from a stack that is either manually or automatically supplied, to caps that are fed thereinto either manually or from a manually or mechanically supplied stack.

It is one object of the present invention to provide cap and clip assembly apparatus, of the character described, capable of automatically and successively stapling together clips and caps that are gravitationally fed thereinto.

It is another object of the present invention to provide cap and clip assembly apparatus, of the character described, which will perform its functions at a much greater rate of speed than heretofore possible.

It is still another object of the present invention to provide automatically performing cap and clip assembly apparatus, of the character described, which will perform continuously and with certainty, without jamming or going out or order, and will require a minimum of care and attention.

It is also an object of the present invention to provide automatic cap and clip assembly apparatus, of the character described, which is sturdy and compact and occupies relatively little space.

It is a further object of the present invention to provide automatically performing cap and clip assembly apparatus, of the character described, which is of relatively simple construction and relatively economical to produce and which will make possible economies of time and labor in the production of the articles utilizing caps having attached clips.

The foregoing and other objects and advantages of the apparatus of the present invention will become more readily apparent to those skilled in the art from the embodiment thereof shown in the accompanying drawing and from the description following. It is to be understood, however, that such embodiment is shown by way of illustration only, to make the principles and practice of the invention more readily comprehensible, and without any intent of limiting the invention to the specific details therein shown.

Generally stated, the invention consists of cap and clip assembling apparatus that is of electro-pneumatic character, in which a gravity-fed cap is positioned in clip-receiving position by a pneumatically actuated, electrically controlled plunger over a pneumatically reciprocable, electrically controlled mandrel, and a gravity-fed and positioned clip is stapled on the cap by a pneumatically reciprocable, electrically controlled ram; the electric circuit through the ram mechanism being controlled by the operative movement of the pneumatically actuated positioning mechanism, and the electric circuit through the positioning means being controlled by the movement of the ram.

More specifically stated, and with particular reference to the embodiment of the invention shown in FIGS. 1 to 10, inclusive, the apparatus comprises a table, 20, formed with a preferably elongated, rectangular opening, 21, therethrough. A cradle, 22, having an appropriately shaped groove, 23, to receive and hold the lower portion of a cap, 24, for moving the cap into clip-receiving position over the opening 21, is slidably supported on the table 20 as by means of lateral extensions that are slidably guided by the parallel guide rails, 25, disposed to one side of one of the shorter edges of the opening 21. The cradle 22 is connected to a piston, 26, of a preferably two-port pneumatic cylinder, 27, whose piston forwarding and retracting ports 28 and 29, respectively, are connected by conduits, 30 and 31, to a four-port solenoid valve, 32. Mounted on the table 20, to the opposite side of the opening 21, is a second, preferably two-port, pneumatic cylinder, 33, whose piston forwarding and retracting ports, 34 and 35, are connected, respectively, by conduits, 36 and 37, to the other two ports of the four-port solenoid valve 32. The piston of the cylinder 33 is provided with a mandrel terminal, 38, shaped to fit the interior of the cap 24 and formed with recessed portions, 39, at its end, to accommodate and swage the stapling prongs of a clip secured on the cap 24. The mandrel 38 may be supported and guided in an opening 41 formed in a supporting block, 42, and in an upright wall or post, 43, mounted on the table.

In operation, the two pneumatic cylinders 27 and 33 are simultaneously actuated, in a manner hereinafter made clear, to move the cradle 22, with a cap 24 disposed therein, into position over the opening 21 and to simultaneously move the mandrel 38 into the cap 24, to support it against clip-stapling pressure. The cylinders 27 and 33 are also simultaneously actuated, in a manner that will be hereafter more fully described, to piston-return position, to thereby simultaneously withdraw the cradle 22 and the mandrel 38, after a stapling operation has been completed, without returning the assembled cap and clip, to permit the assembly to drop out through the opening 21.

Caps may be successively fed into the groove 23 of the cradle 22 while it is in withdrawn or inoperative position, from a magazine, 44, supported over the groove 23, from which the substantially vertically stacked caps drop, successively, by gravity, into the groove. The magazine 44 may be manually supplied with properly oriented caps or may be mechanically supplied as by a suitably designed hopper feed, not thought necessary to be specifically illustrated.

The pocket clips, 45, for which the present apparatus is designed, each comprises an elongated strip of metal that is longitudinally and transversely arcuate and is provided with a head, 46, projecting to the concave side thereof at one end, and with stapling prongs, 47, projecting to the concave side thereof at its other end. The clips 45 are preferably automatically fed, by gravity, or with the assistance of vibration, from a magazine or the like, 48, in which the clips are arranged in a stack, in substantially superposed vertical relation. The magazine may be supported on the table 20, with its lower end in elevated relation thereto, at a point opposite the opening 21 and preferably to the side of such opening opposite to the cap magazine 44.

The clips 45 are fed from the magazine 48 to a clip guide unit, generally designated as 49, which is provided with a guide slot, 50, through which individual clips 45 drop to the top of an under-disposed cap 24.

Figures 8, 9, 10:
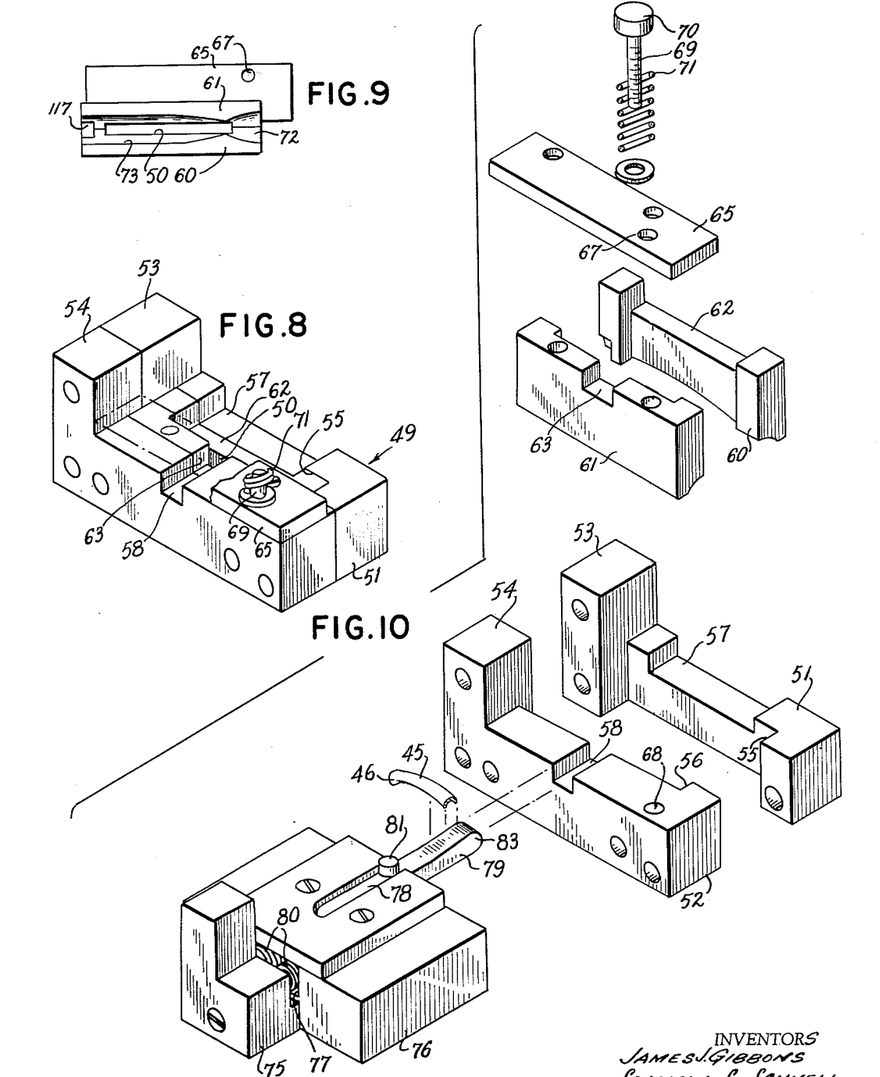
FIG. 8 is an isometric view of a composite assembly for guiding a clip to the top of a cap positioned thereunder.
FIG. 9 is a view of the underside of the assembly of FIG. 8.
FIG. 10 is an exploded view of the components of the clip-guiding assembly and of the associated means for supporting a clip over the guideway until a cap is positioned thereunder.

In order to ensure secure and accurate disposition of the cap 24 in clip-receiving position, as well as to ensure the feeding of but a single clip 45 for each cap moving into clip-receiving position, it has been found desirable, if not essential, to provide a clip-guide unit, 49, of composite construction, including a clip slot defining portion that is resiliently mounted for limited vertical movement and in which provision is made for releasing the clips 45 from the clip magazine 48, one at a time, into the clip guide slot, 50. Such clip guide unit 49 may comprise an outer frame securable in fixed position on the apparatus which may consist of two horizontally disposed blocks, 51 and 52, respectively, each provided at a corresponding end with an upright extension, 53 and 54, respectively, by which the blocks 51 and 52 may be secured in place on the apparatus. The blocks 51 and 52 may also be securable on one another, in any desired manner, and may be provided with registering vertically extending cut-outs, 55 and 56, respectively, on their facing sides, defining a vertically extending rectangular recess, longitudinally centered over the path of a cap moved thereunder. The block 51, on the side of the recess adjacent the clip magazine 48, is also provided with a rectangular cut-out, 57, in its upper surface extending its entire thickness and of a length substantially equal to the length of a clip 45, and of a height substantially equal to the thickness of the clip. The other of the frame blocks 52 is formed with a rectangular, transverse groove, 58, formed in its upper surface substantially opposite the center of the length of the cut-out 57 in the other of the blocks and of corresponding depth.

Snugly and slidably disposed in the vertical recess defined between the two blocks 51 and 52 is a clip guide slot defining structure which may consist of a pair of U-shaped plates, 60 and 61, corresponding in height to the height of the blocks 51 and 52, which are securable, in any desired manner, to one another with their hollow sides facing to define the clip guide slot 50. The plate 60, adjacent to the block 51, is formed with a cut-away portion, 62, in its upper edge corresponding to the cut-away portion 57 in the block 51. The plate 61, adjacent to the block 52, is formed with a transverse groove, 63, registering with the groove 58 in the block 52 and corresponding thereto in shape and size.

The clip guide slot defining plates 60 and 61 are vertically, resiliently movably supported in position by a top plate, 65, which is secured to the upper surface of the plate 61 and extends from the edge of the guide slot 50 outwardly to overhang the adjacent upper surface of the block 52. The top plate 65 and the block 52 are provided with registering vertically extending openings, 67 and 68, preferably in the corner closest to the cap-feeding mechanism, with the opening 68 in the block 52 being threaded to receive the end of the screw, 69, having the head, 70, which is passed through the plate opening 67 and mounts between its head 70 and the plate 52 the expansion spring, 71, that tends to depress the top plate 65 and the guide plates 60 and 61.

The undersides of the guide plates 60 and 61 are scooped, for a short distance, on their ends adjacent the cap-feeding side of the apparatus to provide a short inwardly tapering rounded groove, 72. The undersides of the plates 60 and 61 are also scooped along substantially the remainder of their length to provide an elongated groove, 73, of such curvature and shape as to fit snugly over a portion of an underlying cap 24. The clip guide 49 is so positioned that when a cap 24 is moved by the cradle 22 into clip-receiving position, its open end will move first into the inwardly tapering groove 72, causing the plates 60 and 61 to be raised, and then continue to move until the cap 24 completely underlies the groove 73, permitting the plates 60 and 61 to move, under pressure of spring 71, back into initial position to fit over a portion of the clip projecting above the cradle groove 23 and to be resiliently pressed thereagainst to hold the clip 24 steady in place.

Figure 5:
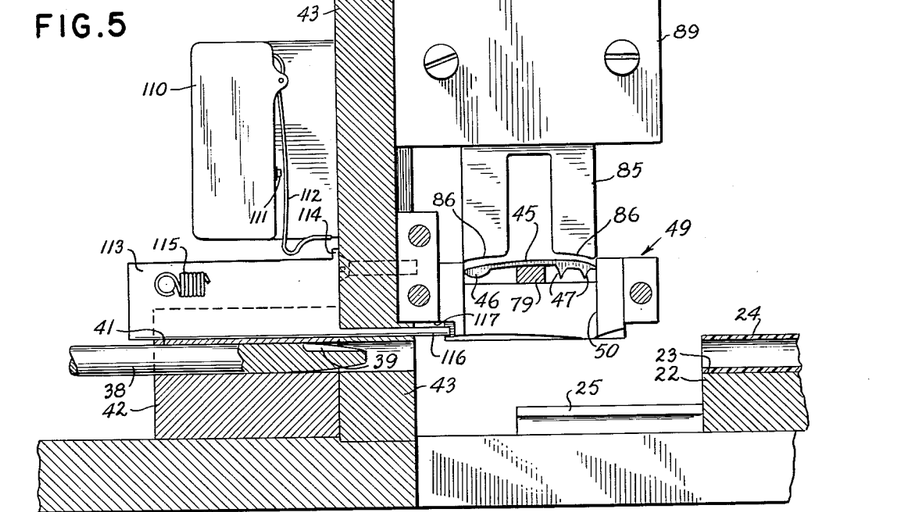
FIG. 5 is a fragmentary, enlarged section taken on line 5—5 of FIG. 3; with the apparatus shown loaded and at rest.
Figure 6:
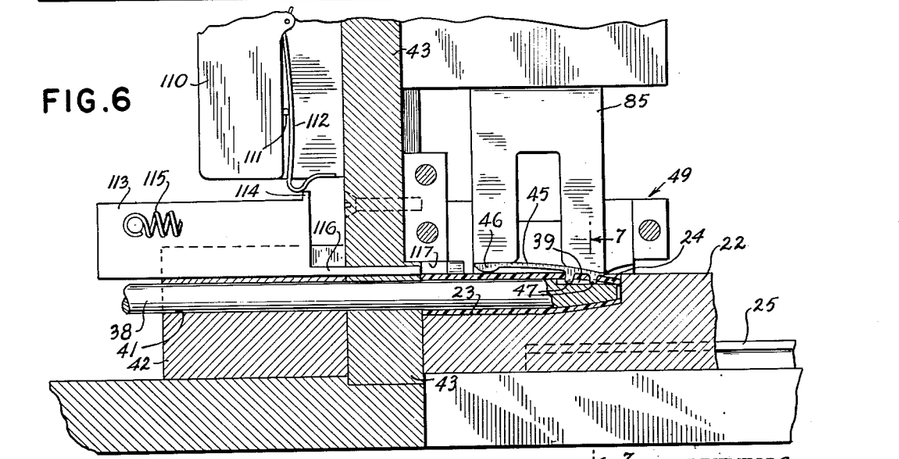
FIG. 6 is a view similar to that of FIG. 5, with the apparatus shown at the end of a stapling stroke.
Figure 7:
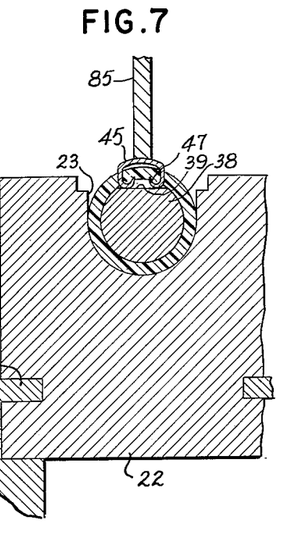
FIG. 7 is a section taken on line 7—7 of FIG. 6.

In order to feed clips 45 from the clip magazine 48, one at a time, into the guide slot 50, simultaneously with the movement of a cap thereunder, we support over the table 20, alongside of the clip guide unit 49, a bracket, 75, to which is secured a block, 76, whose recess, 77, extends transversly of the path of the cradle 22. Disposed within the recess 77 of the block 76 is a slide having a thickened, forked inner end, 78, and a narrow tongue extension, 79, which is normally held in projecting position within the grooves 58 and 63 and over-hanging the clip guide slot 50 by one or more expansion springs, 80, fitting into the recess of the forked slide end 78 and abutting the bracket 75. The slide extension 79 is provided with a vertically disposed pin, 81, fixed therein, which projects to each side thereof and extends to below the block 76. The pin 81 is guided in a slot formed in the block 76 as the slide extension 79 is reciprocated in the recess 77. Normally, the slide extension 79 is disposed by the springs 80 in transverse position across the clip guide lot 50, so that a clip fed from the stack 48 will lie across the slide extension 79, as shown in FIG. 5, and will not drop through the slot 50. The pin 81 is engageable by the lateral extension or wing 82, having a tapered forward end, which is provided at the forward end of the cradle 22, on the side adjacent the pin 81. The wing 82 engages the pin 81 as the cradle 22 is moved into position under the clip guide slot 50, to thereby move the slide extension 79 inwardly, away from slot 50, and permit the overlying clip 45 to drop into the guide slot 50. The slide extension 79 is provided with an outwardly and upwardly thickening end, 83, to ensure movement of the clip dropped thereon into guide slot overlying position and against the horizontally mounted plate 65, which also serves as a wiper for the clip 45 and permits, because of its resilient mounting described above, the withdrawal of the thickened extension end 83 thereunder.

The cap and clip, properly positioned, as described above, are stapled together by a vertically reciprocating ram, 85, preferably of forked shape, and having a bottom edge, 86, conforming in shape to the longitudinally arcuate shape of the clips 45. The ram 85 is formed at the end of a preferably thicker shank, 88, that is reciprocably guided in an open-ended guideway, 89, supported on the upright 43 in position to have the ram register with the clip guide slot 50. The upper end of the shank 88 is pivotally connected, as at 91, to one end of a toggle, generally designated as 92, whose other end is pivotally connected to a bolt, 93, set in the plate, 94, which is supported on the upright 43 and which overhangs the ram guideway 89. The two arms forming the toggle 92 are joined by means of a pin, 96, which projects to each side of the joint and is engaged in the forked end of a forked coupling, 97, that is secured on the end of a piston, 98, of a solenoid-actuated, automatic-return compressed air cylinder, 99, that is pivotally supported by its solenoid end, as at 100, on an upright, 101, mounted on the table 20. The ram and toggle are so arranged that ejection movement of the piston 98, which straightens the toggle, will cause the ram 85 to strike against an underlying clip 45 to have its prongs 47 pierce through the wall of the underlying clip 24 and swage the projecting ends of the prongs against the faces of the cut-outs 39 in the mandrel 38, to thereby securely staple the clip on the cap.

The ram shank 88 is preferably formed in two parts; namely, an upper part and a lower part that are slidably interconnected on one another for limited separation in any suitable manner, and are each formed with a recess, 102, facing the other, in which is housed one or more expansion springs, 103, which normally hold the two shank parts to the limit permitted by their slidable interconnection.

The stroke of the piston 98 may be so arranged that it will slightly over-center the toggle pivot 96 on its outward stroke to thereby have the ram 85 also resiliently strike the underlying cap and clip on the return stroke of the toggle for the purpose of effecting the ejection of the assembled clip and cap through the table opening 21, upon the withdrawal of the cradle 22 and mandrel 38, simultaneously with the upward stroke of the ram, as will be hereafter made clear.

It will be clear that the stapling of the cap and clip will be effected by the ram 85 when the two shank sections are in contact with one another; whereas the ejection of the assembled cap and clip on the return of the toggle, will be effected, resiliently, by a lengthened shank whose sections are spaced apart by springs 103, to provide an adequately long, resilient ejection stroke.

Figure 11:
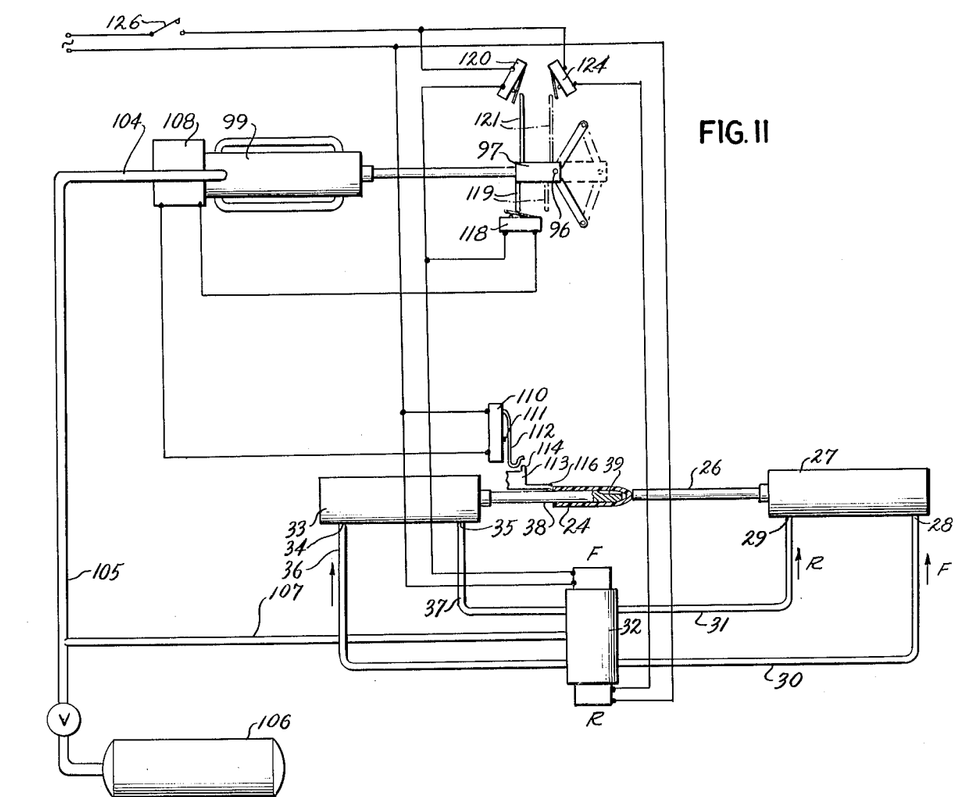
FIG. 11 is a more or less schematic view showing one proposed pneumatic and electric circuit for the apparatus.
Figure 12:
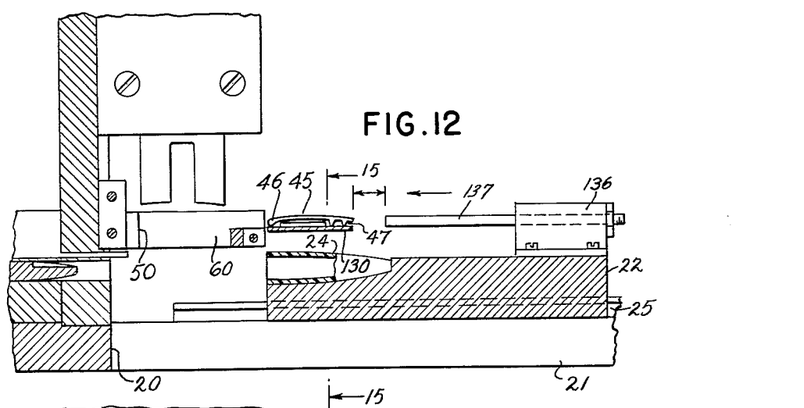
FIG. 12 is a fragmentary, enlarged view similar to that of FIG. 5, illustrating a modified form of clip feeding means for the apparatus.
Figure 13:
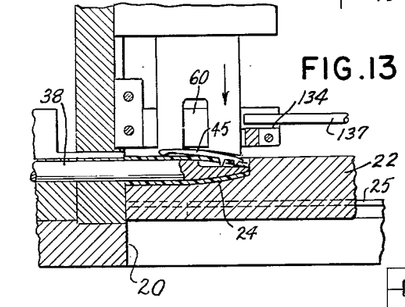
FIG. 13 is a view of the feeding mechanism of FIG. 12, at the end of a stapling stroke.
Figure 14:
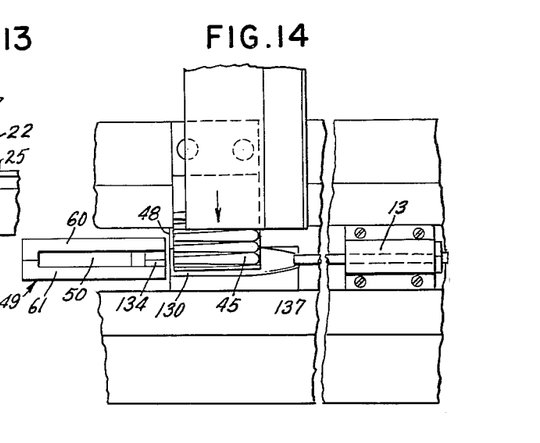
FIG. 14 is a top plan view of the feeding mechanism of FIG. 12.
Figure 15:
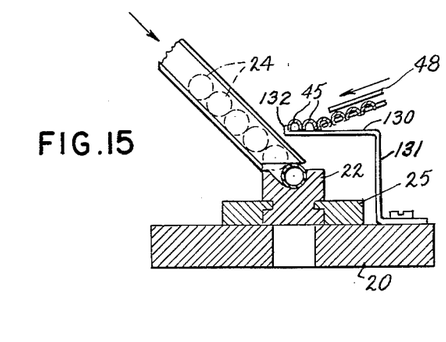
FIG. 15 is a section taken on line 15—15 of FIG. 12.

The cylinder 99 is connected by a conduit, 104, to a main compressed air conduit, 105, which is, in turn, connected to the source of compressed air, as a tank or compressor, more or less diagrammatically shown as 106, in FIG. 11 of the drawing. The same conduit 105 may also be connected by conduit, 107, to the valve 32.

The sequential, pneumatically effected cap positioning movement of the cradle 22, the clip stapling movement of the ram 85, and their return to initial, non-operative position, are electrically controlled by connecting the solenoids F and R of the valve 32 and the solenoid 108 of the cylinder 99 in alternately operated electric circuits; in a manner that the completion of the movement of a cap 24 into clip-receiving position by the cradle 22 closes a circuit through the solenoid 108 of the cylinder 99, to eject its piston 98 for moving the toggle 92 and ram 85 into stapling position; while the movement of the toggle 92 into clip-stapling position closes a circuit through the solenoid R of the valve 32 for returning the cradle and mandrel to initial position, and breaks the circuit through the solenoid 108, automatically returning the toggle to initial position; the discharge of the stapled cap breaking the circuit through the solenoid 108 at a second point to keep the toggle 92 in non-operative position, and simultaneously closing the circuit through the solenoid F of the valve 32 for propelling the pistons of the cylinders 26 and 33 to move the cradle 22 and mandrel 38 again into operative position, to repeat the cycle.

To control the circuit through the solenoid 108, of the cylinder 99, there is mounted on the mandrel side of the opening 21, in any desirable manner, in alinement with the clip slot 50, a normally open switch, more or less diagrammatically indicated at 110, provided with a projecting switch-actuating button, 111, facing the slot 50, and secured over the button 111, by one end, is a spring arm, 112, normally tensioned away from the button 111 with its free end extending below the switch 110. Slidably mounted below the switch 110 is a bar, 113, having an upright projection, 114, that overlaps the free end of the leaf spring 112. The slide bar 113 is normally tensioned, as by spring, 115, secured thereto by one end and by the other end to a pin set in the block 42, to have its projection 114 spaced from the leaf spring 112. The slide bar 113 is formed with an extension, 116, which normally overlies the opening 21 and extends into the recess, 117, formed in the adjacent bottom corner of the guide plates 60 and 61. The slide extension 116 is thus in position to be engaged by the edge of an advancing cap 24, to be moved thereby with the slide 113 to have the upright projection 114 engage the end of the spring arm 112 to move it against the button 111, to close switch 110 as the cap reaches its final, clip-receiving position. The normally open and the normally closed positions of the switch 110 are respectively shown in FIGS. 5 and 6 of the drawing.

Each of the solenoids, R and F, of the valve 32, is connected in a separate circuit, which circuits are alternately opened and closed by the reciprocation of the toggle-operating piston 98. For that purpose, there is provided a normally open switch, 118, in position to be closed, as by the projection 119, on the coupling 97 mounted on the end of the piston 98 of the cylinder 99, and, when the piston 98 is in retracted position, to close the gap in the circuit of the solenoid designated as F, which opens the ports of the valve 32, connected by conduits 30 and 36, respectively, to ports 28 and 34 of the cylinders 26 and 33, respectively, to pass compressed air into the piston-forwarding ends of the said cylinders. The switch 118 is also connected in the circuit of the solenoid 108, of the instant self-returning cylinder 99, to keep such solenoid inactive as long as the F circuit is open and thus prevent more than one impulse through the solenoid while the switch 110 is closed.

Figure 1:
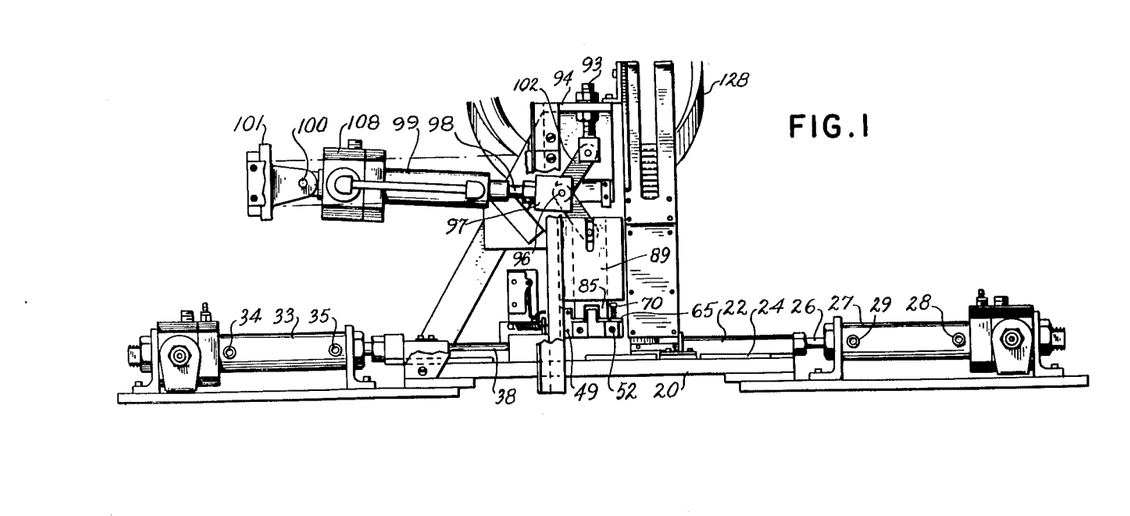
FIG. 1 is a front elevation of one embodiment of a cap and clip assembling apparatus of the present invention; with an associated mechanical means for supplying and orienting clips for gravitational feeding to the apparatus indicated in fragmentary form.
Figure 2:
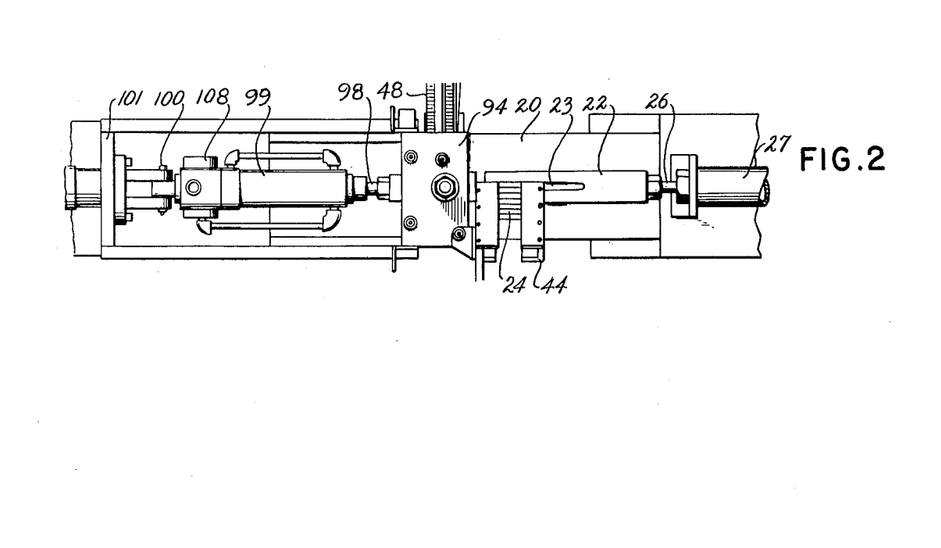
FIG. 2 is a fragmentary top plan view of the apparatus shown in FIG. 1, on an enlarged scale.
Figure 3:
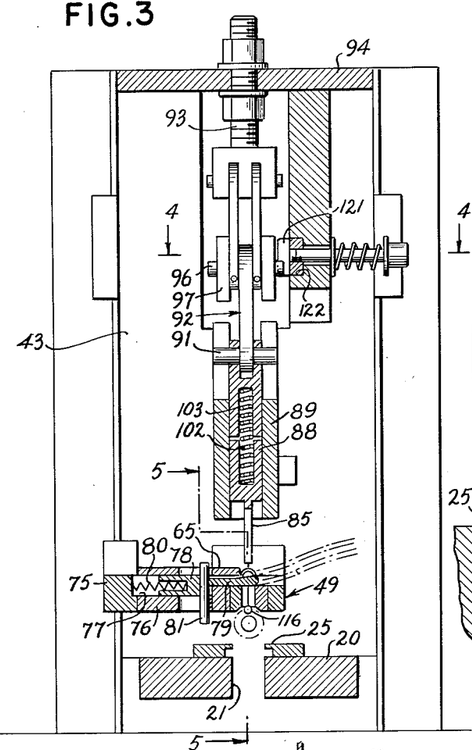
FIG. 3 is an enlarged, vertical, sectional view taken on line 3—3 of FIG. 4.
Figure 4:
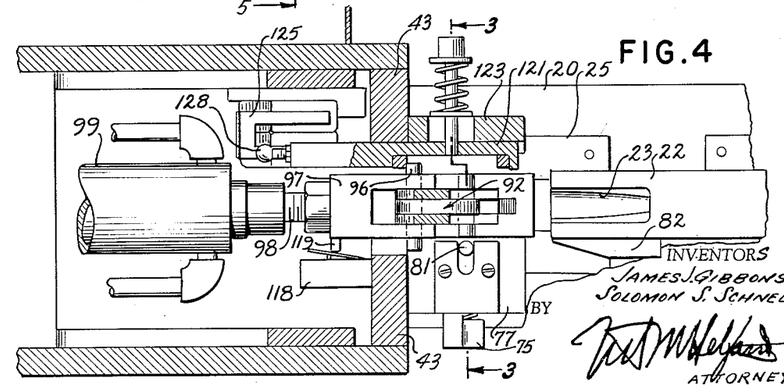
FIG. 4 is a transverse section taken on line 4—4 of FIG. 3.

The circuit through the solenoid F is provided with a second, normally open switch, 120, which may be an independent switch, as indicated diagrammatically in FIG. 11 of the drawings, or may be one side of a single pole two-way switch, as indicated in FIG. 4 of the drawings, wherein the switch is actuated by a slide, 121, supported in a groove, 122, formed in a dependent plate, 123, dependently secured to the top plate 94. The groove 122 is formed opposite the reciprocating path of the toggle joint pin 96. The latter pin, when the piston 98 is retracted, engages the slide 121 to normally close the switch 120 through the piston-forwarding solenoid F of the valve 32, as by the contact of the head 128, at its end, against switch-closing arm 125. The toggle pin 96 moves the slide 121 out of contact with the switch-closing arm 125, to break the circuit through the piston-forwarding solenoid F of the valve 32 by releasing the switch-closing arm 125 and by closing a switch, 124, either automatically by the released arm, in a single pole two way switch, or positively, as indicated in FIG. 11, in a third circuit connected to the return solenoid R, of the valve 32, which brings about the closing of the valve ports leading to conduits 30 and 36 and opens the ports to conduits 31 and 37, to return the pistons 26 and 38, to initial, retracted position.

The retraction of the pistons 26 and 38 releases the cap to drop out of the apparatus, under the return impact of ram 85, thereby releasing the slide bar 113, and automatically opening the switch 110, which breaks the circuit through the solenoid 108 of the cylinder 99 and retracts the toggle 92 to break the circuit through the return end of the valve 32 and to close the circuit at the forwarding end of the valve 32, as well as the switch 120, in the circuit of solenoid 108, to again start the cycle by the projection of the pistons 26 and 38. Both of the circuits described above are controlled by a main hand-operated switch, 126, which, once closed, permits the continuous automatic operation of the machine. It will here be noted that the apparatus will automatically stop upon the absence of a cap below the slot 50, for any reason, and also upon the jamming of any cap in place, by reason of the fact that the switch 110 is actuated by the cap itself.

To operate the apparatus of the present invention, a plurality of caps are disposed in oriented arrangement in the magazine 44, either by automatic means or manually, to be fed, one at a time, into the groove 23 of the cradle or carriage, 22, as the former is reciprocated past the outlet of the magazine; the groove 23 removing a single cap each time it is moved forwardly into position under the clip guide slot 50. A plurality of clips 45 are also arranged, in properly oriented position, in the magazine 48, either manually or automatically, as by suitable hopper feeding means, fragmentarily indicated at 128 in FIG. 1 of the drawings.

When the apparatus is inoperative, the electric circuit therethrough is broken by the manually operated control switch, diagrammatically shown at 126 in FIG. 11 of the drawing, and both, the cradle 22 and the mandrel 38 are in withdrawn position, and the slide extension 79 is in extended position, overhanging the clip guide slot 50 and supporting the lowermost of the clips 45 in the magazine 48. Also, when the apparatus is inoperative, the toggle piston 98 and toggle 92 are in withdrawn position, and the projection 119 on the toggle engaging coupling 97 closes the normally open switch 118 in the circuit of the piston-forwarding solenoid F of the valve 32 to open its ports for passing compressed air into the piston advancing ports of the cylinders 27 and 33, upon activation of the circuit through the apparatus. At the same time, the other switch 120 in the circuit of the piston forwarding solenoid F of the valve 32 is also closed, either automatically or by the action of the pin 96 and slide 21, to thereby set up the circuit through the solenoid F for complete closing by the manual switch 126. At the same time, the circuit through the solenoid 108 of the cylinder 99 is broken by the normally open switch 110, inactivating the solenoid 108; the slide 113 which closes such switch being tensioned away therefrom by the spring 115.

The manual closing of the control switch 126 completes the circuit through the F solenoid of the valve 32. This causes compressed air to flow through conduits 30 and 36 into ports 28 and 34 of the respective cylinders 27 and 33 to advance their pistons and move the cradle 22 toward the clip guideway slot 50, to advance a cap 24 into clip receiving position, and simultaneously advances the mandrel 38 into such cap. As the cradle moves under the slot 50, its wing 82 engages the pin 81 of the slide tongue 79, to move the same out of slot overhanging position, to permit the clip 45 resting on such tongue to be wiped off therefrom by the edge of the plate 65 and to drop into the guide slot 50 upon the underlying cap 24.

As the cap approaches its clip-receiving position, its advancing edge engages the extension 116 of the slide 113 and moves it to have its projection 114 engage the spring 112 and close the switch 110, as the cap moves to rest. The closing of the switch 110 activates the solenoid 108 of the cylinder 99, to eject the piston 98 and straighten the toggle 92, thereby moving the ram 85 to strike the clip 45 resting on the cap 24, to staple the two together.

The forward movement of the toggle 92 moves the coupling 97 and its projection 119 away from contact with the normally open switch 118, to permit the same to open and thereby immediately break the circuit through the solenoid 108 of the automatically returning cylinder 99, to prevent re-activation of the solenoid and repetition of the ram depressing movement of the piston 98 thereof, before the entire cycle is completed. The movement of the toggle 92 into ram depressing position also breaks the circuit through the piston forwarding solenoid F of valve 32 at the switch 120 and closes the switch 124 to close the circuit through the R solenoid of valve 32, shifting the flow of compressed air to front ends of the cylinders 26 and 33 and simultaneously retract the cradle 22 and mandrel 38 to initial position; the stapled cap and clip being wiped off the cradle and dropping through the opening 21, with the aid of the return stroke of the resilient ram which is overbalanced on its forward stroke. The retraction of the cradle 22 and dropping of the stapled cap 24 releases the slide 113 and opens the second switch 110 in the circuit of the solenoid 108, to inactivate the same.

The automatic return of the piston 98 of cylinder 99 and of the toggle coupling 97 to initial position also opens switch 124 and breaks the circuit through the R solenoid of valve 32, and closes switches 118 and 120 in the circuit of the F solenoid of valve 32 and in the circuit of the solenoid 108, again sending compressed air through the piston forwarding ends of the cylinders 26 and 33, to automatically renew the stapling cycle.

In FIGS. 12 through 15 of the drawings, we have illustrated, more or less diagrammatically, a modified form of clip-feeding mechanism for the apparatus of the present invention. In this embodiment, the slide and tongue, 78 and 79, which support a clip over the guide slot 50 until a cap is positioned thereunder and the mechanism for supporting and moving such slide and extension 79 is eliminated, and the clips are moved, positively, into position over the slot 50, from one end thereof, to drop thereinto by gravity, at the same time that the cap is positioned under the slot 50. Thus, in this embodiment, the magazine 48 terminates over a platform, 130, that is supported over the forward edge of the cradle 22 at a level slightly below the tops of the plates 60 and 61 of the clip guide 49. The platform 130 may be supported from the table 20 by leg, 131, and may be formed at its edge facing the cap magazine with an upright flange, 132, which will position the bottom-most of the clips 45 fed from the magazine 48 in longitudinal alinement with the clip guide slot 50 of the clip guide member 49.

In this embodiment of the invention, the cutouts 57 and 62 in the block 51 and plate 60 are eliminated, as are grooves 58 and 63 in the block 52 and plate 61, respectively. In lieu thereof, a groove, 134, is formed in the ends of blocks 51 and 52 and plates 60 and 61, in their upper edges, in longitudinal alinement with the slot 50, through which groove 134, a clip 45 may be guided into the slot 50. To move the outermost of the clips 45 into the guide slot 50 in synchronism with the movement of a cap 24 to underlie the said slot 50, a block, 136, is mounted on the outer end of the cradle 22, into which is set, at appropriate height, a rod, 137, extending longitudinally over the cradle 22, whose forward end, which is spaced a distance from the clip 45 when the cradle is in retracted position, will engage against the end of the clip 45 after the cap 24 has been started on its movement into clip-receiving position, to push the clip 45 off the platform 130 through the groove 134 and into the slot 50.

This completes the description of the apparatus of the present invention. It will be readily apparent that the apparatus is completely automatic, repeating the clip and cap feeding and stapling operations automatically in the proper sequence. It will also be apparent that the apparatus of the present invention is particularly adaptable for use with automatic clip and cap stapling apparatus.

It will additionally be apparent that the apparatus of the present invention is capable of operating at such great speeds that were not heretofore possible, either by manual or by automatic apparatus that may have heretofore been used.

It will likewise be apparent that the apparatus of the present invention is of relatively simple and compact construction, and embodies a relatively small number of parts that will perform steadily and accurately, with a minimum of care and attention.

It will be further apparent that numerous modifications and variations in the automatic cap and clip assembling apparatus of the present invention may be made by anyone skilled in the art, in accordance with the principles of the invention hereinabove set forth, and without the exercise of any inventive ingenuity. We desire, therefore, to be protected for any and all such modifications and variations that may be made within the spirit of the present invention and the scope of the claims hereto appended.

What we claim is:

1. Apparatus for stapling a pocket clip on a cap of the character described, comprising, in combination with clip supplying means, a body having a clip guide slot formed therethrough, a cap moving member, means supporting said cap moving member for reciprocal movement into and away from position disposing a cap against said body alongside one end of said clip guide slot, a mandrel adapted to fit within said cap, means reciprocately supporting said mandrel for movement in and out of a cap disposed against said body, mechanism for reciprocating said cap moving means and said mandrel, means synchronized with said mechanism for moving a clip from said clip supply into said guide slot upon positioning of a cap against said body, a ram, means reciprocately supporting said ram for moving in and out of said guide slot, and means synchronized with said mechanism reciprocating said ram for movement into said guide slot upon movement of a clip into said guide slot.

2. Apparatus for successively securing a plurality of pocket clips to caps of the character described, comprising a body having an elongated clip guide slot extending vertically therethrough, a cap supporting member, means mounting said member for reciprocal movement in and out of position disposing a cap against said body under said slot, means reciprocating said member, a mandrel adapted to fit within said cap, means supporting and reciprocating said mandrel in and out of a cap positioned below said slot, means automatically supplying a clip into said slot through the upper end thereof upon disposal of a cap therebelow, a ram, means mounting said ram for reciprocal movement in and out of said clip guide slot through the upper end thereof into contact with said clip, means reciprocating said ram, means actuated by said ram reciprocating means in the withdrawn position of said ram from said slot simultaneously moving said member and said mandrel into position supporting a cap under said clip guide slot and simultaneously supplying a clip into said slot upon said cap, means actuated by said cap positioned under said slot activating said ram reciprocating means advancing said ram into said slot, and means actuated by said ram reciprocating means, in the advanced position of said ram, simultaneously reversing the movement of said ram reciprocating means to withdraw said ram from said slot and actuating said member reciprocating means and said ram reciprocating means to move said member and said mandrel away from below said slot.

3. The apparatus of claim 2, wherein said means actuated by said cap is automatically deactivated upon removal of said cap from below said clip guide slot.

4. The apparatus of claim 2, wherein said cap supporting member comprises a body having a groove formed in the surface thereof, said groove conforming to and adapted to accommodate a portion of the thickness of said cap, said groove opening into an edge of said body.

5. The apparatus of claim 2, wherein said cap-supporting member comprises a body having a groove formed in a surface thereof extending to an edge thereof, said groove adapted to accommodate a portion of the thickness of a cap, and wherein means are provided for vertically movably supporting said slotted body and means are provided for resiliently resisting the vertical movement of said slotted body, said slotted body having a groove formed on the underside thereof opening to an edge thereof and encompassing said slot, said groove in said underside shaped to conform to a complementary portion of said cap, said cap, upon movement into position below said slot raising said slotted body and engaging within said groove therein.

6. The apparatus of claim 2, wherein said cap supporting member comprises a body having a groove formed in the surface thereof and opening into an edge thereof, said groove conforming to and adapted to accommodate a portion of the thickness of one of said caps, and wherein a magazine adapted to support a plurality of said caps in substantially superposed relation is supported adjacent said grooved body and over said groove when said grooved body is in withdrawn position, said groove adapted to receive and move the lowermost of said caps in said magazine upon each forward movement thereof toward said clip guide slot.

7. The apparatus of claim 2, wherein said means supplying a clip into said slot includes a magazine mounted adjacent the upper opening of said slot, said magazine adapted to hold a plurality of clips in substantially superposed relation and means depositing the lowermost of said clips in said slot upon movement of said cap supporting member below said slot.

8. The apparatus of claim 2, wherein said means supplying a clip into said slot includes a tongue resiliently and slidably held over the upper opening of said slot, a magazine mounted adjacent said upper opening, said magazine adapted to support a plurality of clips in substantially superposed relation, with the lowermost thereof resting on said tongue, and means associated with said tongue engageable by said member upon its movement toward said slot, for sliding said tongue away from said slot to drop said clip into said slot.

9. The apparatus of claim 2, wherein said means supplying a clip to said slot includes a horizontally disposed platform mounted above said table in elevated relation to said member and with one edge in substantial register with one edge of said slot and another edge in substantial longitudinal alinement with an adjacent edge of said slot, a magazine adapted to support an upwardly extending column of clips and having a bottom outlet mounted above said platform in position to deposit its lowermost clip by gravity unto said platform in parallel relation to said slot, and means mounted on said body adapted to engage said clip upon movement of said member to dispose a cap below said slot, to move said clip from said platform over said slot to drop thereinto.

10. The apparatus of claim 2, wherein said means supplying a clip to said slot includes a horizontally disposed platform mounted above said table in elevated relation to said member and below the level of said body, said platform disposed in register with an end edge of said slot and with its end edge in longitudinal alinement with a said edge of said slot, said body having a groove formed in the end edge portion of said slot in register with the end portion of said platform, a magazine adapted to support an upwardly extending column of clips and having a bottom outlet mounted above said platform in position to deposit the lowermost of the clips therein on said platform, and a rod mounted on said member in spaced vertical relation thereto and movable with said member upon movement of the latter toward positioning a cap below said slot, to displace said clip from said platform toward said slot.

11. Apparatus for automatically, successively securing pocket clips to caps of the character described, including a body having a vertically extending clip-guide slot formed therethrough, a cap supporting member, means mounting said member for reciprocal movement in and out of position disposing a cap under said slot, means reciprocating said member including a pneumatic cylinder and a piston reciprocable within said cylinder and having a rod extending through one end of said cylinder and engaging said member, a mandrel adapted to fit within a cap, means supporting and reciprocating said mandrel in and out of a cap positioned below said slot including a pneumatic cylinder, a piston reciprocable within said second cylinder and having a rod extending through one end thereof supporting said mandrel, electrically controlled means connected in an electric circuit simultaneously directing compressed air into each of said cylinders to propel their pistons to extend their rods outwardly of said cylinders, electrically controlled means connected in a second electric circuit for simultaneously directing compressed air into each of said cylinders to retract their piston rods inwardly therein, a ram, means mounting said ram for vertical reciprocal movement in and out of said clip guide slot through the upper end thereof, electrically controlled means connected in an electric circuit for reciprocating said ram, a normally open switch in said ram reciprocating circuit, means actuated by a cap positioned below said slot for closing said ram reciprocating circuit, a normally open switch in said first electric circuit, means on said ram reciprocating means closing said second named switch upon movement of said ram into withdrawn position from said slot to close said first named circuit, and a normally open switch in said second circuit and means on said ram reciprocating means for closing said last named switch upon movement of said ram into said slot.

12. Apparatus for automatically, successively securing pocket clips to caps of the character described, including a body having a vertically extending clip guide slot formed therethrough, a cap supporting member, means mounting said member for reciprocal movement in and out of position disposing a cap below said slot, means reciprocating said member including a pneumatic cylinder, a piston reciprocable within said cylinder and having a rod extending through one end of said cylinder engaging said member, a mandrel adapted to fit within said cap, means supporting and reciprocating said mandrel in and out of a cap positioned below said slot including a pneumatic cylinder, a piston reciprocable in said second cylinder and having a rod extending through an end thereof and connected to said mandrel, electrically controlled means connected in an electric circuit simultaneously directing compressed air into one end of each of said cylinders to propel their pistons into rod ejecting position, electrically controlled means connected in a second electric circuit for simultaneously directing compressed air to the other end of each of said cylinders to propel their pistons into rod retracting position within said cylinders, a ram, means mounting said ram for vertical reciprocal movement in and out of said clip-guide slot through the upper end thereof, electrically controlled means connected in an electric circuit reciprocating said ram, a normally open switch in said ram-reciprocating circuit, automatically returnable means movable to close said normally open switch upon movement of a cap below said slot, a second normally open switch in said first named cylinder circuit, means on said ram-reciprocating means closing said second named switch when said ram is in withdrawn position from said slot to close said first named cylinder circuit, and a third normally open switch means in said second named cylinder circuit and means on said ram reciprocating means engaging said last named switch to close the same upon movement of the ram into said slot.

13. The apparatus of claim 12, including a second normally open switch in said ram-reciprocating means circuit, and means on said ram-reciprocating means closing said last switch upon movement of said ram into withdrawn position from said slot.

14. The apparatus of claim 12, wherein said ram comprises a pair of resiliently-spaced, slidably connected portions, including a slot entering portion and the means reciprocating said ram comprise a toggle consisting of a pair of arms pivotally connected by one of their ends, the other end of one of said arms connected to a fixedly supported element on said apparatus, the other of said arms pivotally connected by its other end to the other of said ram portions, a pneumatic cylinder, means pivotally supporting said cylinder on said apparatus at one end thereof, said cylinder having a piston reciprocable therewithin, said piston having a rod extending outwardly through the other end thereof, said rod pivotally engaged on the pivotal connection of said toggle arms, said piston having a stroke adapted to over-center said toggle upon extreme outer movement of said piston rod therefrom.

15. The apparatus of claim 12, wherein the means for selectively controlling the flow of compressed air into said first and second-named pneumatic cylinders comprises a four outlet-port valve connectible to a source of compressed air, two of said ports each connected to each of said cylinders to a corresponding side of the piston thereof, and the two others of said ports each connected to one of said cylinders to the other side of the piston thereof, and solenoid means on said valve connected in said first-named and said second-named electric circuits for alternately opening one pair of said ports and simultaneously closing the other pair thereof.

16. In apparatus for securing a pocket clip to a cap of the character described, a clip guide member having a clip guide slot formed therethrough, means supporting a column of caps, movable means engaging an end cap of said column in one position thereof and moving said cap adjacent one end of said slot in the other position thereof, mechanism for moving said cap engaging means, a mandrel adapted to fit within said cap, mechanism moving said mandrel in and out of said cap positioned adjacent said slot, means synchronizing the movement of said cap engaging means and said mandrel to move said mandrel into said cap as said cap is moved adjacent said slot, means supporting a column of clips adjacent the other end of said slot, mechanism disposing an end clip in said clip column into said slot through the other end thereof, means synchronizing the movement of the clip disposing mechanism with the movement of said mechanism disposing said cap adjacent said slot, a ram, means supporting said ram for movement in and out of said slot through said other end thereof, mechanism for moving said ram, means synchronized with the movement of said cap engaging means actuating said ram-moving mechanism to move said ram into said slot upon disposal of a clip therein, and means actuated by said ram-moving mechanism activating said mechanism moving said cap engaging means to return said cap engaging means to said first named position thereof.

17. The apparatus of claim 16, wherein said clip guide slot is vertically disposed and said cap-engaging means is arranged to dispose a cap below said slot in said second position of said cap engaging means.

18. The apparatus of claim 16, wherein said mechanism for moving said ram is electrically controlled and connected in an electric circuit, said electric circuit including a normally open switch, and wherein automatically returnable means are provided, engageable by said cap when moved into position adjacent said slot to be moved by said cap into switch closing position.

19. The apparatus of claim 16, wherein said clip guide member is disposed with said slot vertically extending and means are provided for supporting said member for limited vertical movement including resilient means resisting said vertical movement of said member, and wherein said cap upon movement thereof into position adjacent said slot end engages said member to move it upwardly and is resiliently engaged by said member.

20. In apparatus for securing a pocket clip to a cap of the character described, a clip guiding member having a clip guide slot formed therethrough, said member supported with its said slot in vertically extending position, and means mounting said member for limited vertical movement, including a tubular body fixedly supported on said apparatus, said member disposed within said body, a plate secured to the upper surface of said member alongside said slot, said plate overlying the adjacent upper surface portion of said body, registering openings formed through said plate and in said body, a pin having a head disposed through said plate opening and secured within said body opening, and an expansion spring interposed between said pin head and said plate, around said pin to resiliently press said plate against the upper surface of said body.

21. Apparatus for stapling a pocket clip on a cap of the character described, comprising, in combination with clip-supplying means, a body having a clip guide slot formed therethrough, a cap moving carriage, means supporting said cap moving carriage for reciprocal movement into and away from position disposing a cap against said body along one end of said clip guide slot, mechanism moving said carriage into the first of said positions, means moving a clip from said clip supply into said guide slot upon positioning of a cap against said body, a ram, means reciprocating said ram for reciprocal movement into and out of said guide slot and mechanism actuated by said cap carriage moving means to move said ram into said guide slot against said clip.

22. Apparatus for stapling a pocket clip on a cap of the character described, comprising, in combination with clip-supplying means, a body having a clip guide slot formed therethrough, a cap moving carriage, means supporting said cap moving carriage for reciprocal movement into and away from position disposing a cap against said body along one end of said clip guide slot, mechanism moving said carriage into position of disposing a cap against said body, means moving a clip from said clip supply into said guide slot upon positioning of a cap against said body, a ram, means reciprocating said ram for reciprocal movement into and out of said guide slot, mechanism actuated by said cap carriage moving means for activating said ram-reciprocating means to move said ram into said guide slot against said clip, and means actuating said carriage-moving mechanism to retract said carriage upon completion of said clip engaging stroke of said ram.

23. Apparatus for stapling a pocket clip on a cap of the character described, comprising, in combination with clip-supplying means, a body having a clip guide slot formed therethrough, a cap moving carriage, means supporting said cap moving carriage for reciprocal movement into and away from position disposing a cap against said body along one end of said clip guide slot, mechanism moving said carriage into position disposing a cap against said body, means moving a clip from said clip supply into said guide slot upon positioning of a cap against said body, a ram, means reciprocating said ram for reciprocal movement into and out of said guide slot, mechanism actuated by said cap carriage moving means for actuating said ram-reciprocating means to move said ram into said guide slot against said clip, means retracting said carriage upon completion of said clip engaging stroke of said ram, and means actuating said ram-reciprocating means for retracting said ram from said slot upon retraction of said cap carriage from said first position thereof.

References Cited in the file of this patent

UNITED STATES PATENTS

| | | |
|---|---|---|
| 2,408,379 | Day | Oct. 1, 1946 |